United States Patent [19]

Dirksing et al.

[11] 4,436,269
[45] Mar. 13, 1984

[54] DISPENSER SUSPENSION MEANS EMPLOYING PLANAR SPRING-LOADED DETENT

[75] Inventors: Robert S. Dirksing, Cincinnati; Dale E. Barker, Hamilton, both of Ohio

[73] Assignee: The Procter & Gamble Company, Cincinnati, Ohio

[21] Appl. No.: 210,965

[22] Filed: Nov. 28, 1980

[51] Int. Cl.$^3$ ............................................. A47G 55/00
[52] U.S. Cl. ........................................ 248/214; 4/227; 4/228; 403/107; 403/329; 248/215; 248/297.2
[58] Field of Search ................... 248/214, 215, 309 R, 248/311.2, 125, 297.3, 297.2, 221.3; 4/227, 228; 403/107, 329

[56] References Cited

U.S. PATENT DOCUMENTS

| | | | |
|---|---|---|---|
| 2,722,394 | 11/1955 | Titmas | 248/311.2 |
| 3,007,177 | 11/1961 | Jackson et al. | 248/309 R |
| 3,477,679 | 11/1969 | Lovitz | 248/309 |
| 3,778,850 | 12/1973 | Bryan | 4/228 |
| 3,965,497 | 6/1976 | Corsette | 4/228 |
| 4,203,373 | 5/1980 | Conti | 248/297.2 |
| 4,284,981 | 8/1981 | Black | 248/214 |
| 4,340,199 | 7/1982 | Brock | 248/221.3 |

*Primary Examiner*—William H. Schultz
*Assistant Examiner*—Ramon O. Ramirez
*Attorney, Agent, or Firm*—E. Kelly Linman; John V. Gorman; Richard C. Witte

[57] ABSTRACT

A hanger for supporting an article such as a dispenser for toilet tank chemicals on a vertical wall member such as a toilet tank at a predetermined height adjustably selected by the user. The hanger includes a means for securing its uppermost end to the wall member, a bayonet member, a channel means into which the bayonet member inserts, at least one resiliently deformable projection located along a longitudinal edge of either the bayonet member or the channel means and a multiplicity of spaced, projection receiving means, complementary to the projection, located on a longitudinal edge of the other of either the bayonet member or the channel means and in the same plane as the projection. The projection extends outwardly from the longitudinal edge and is resiliently deformable in the plane of the member to which it is attached. The hanger is manually adjusted by the movement of the resiliently deformable projections between the projection receiving means. The article to be supported may be attached to or be integral with either the bayonet member or the channel means.

16 Claims, 14 Drawing Figures

DISPENSER SUSPENSION MEANS EMPLOYING PLANAR SPRING-LOADED DETENT

TECHNICAL FIELD

The present invention relates to hangers for adjustably supporting articles on a vertical wall member.

In particular, the present invention relates to a hanger comprising a means for attachment to a vertical wall member, a bayonet member, a channel means and at least one resiliently deformable projection attached to or integrally formed with either the bayonet member or the channel means and a complementary projection-receiving means attached to or integrally formed with the other of either the bayonet member or the channel means. The bayonet member inserts into the channel means and the interaction of the resiliently deformable projections and the projection receiving means provides for vertical adjustment.

BACKGROUND ART

Hangers for supporting articles from a vertical wall member and which provide vertical adjustment means are well known in the prior art. For example, U.S. Pat. No. 3,881,673, issued to Peterson on May 6, 1975 discloses a tensioning device designed primarily to support a filter bag in a baghouse gas filtering apparatus. The device comprises a pair of pivoted, scissor-like bars having ratchet teeth. The bars fit through a bore in a rigid support frame and the teeth engage the horizontal member of the support frame. Advancing the bars through the bore draws a suspensory means that is attached to a filter bag and to the advancing bars, thereby applying tension to the bag. U.S. Pat. No. 1,690,941 issued to Nickerson on Nov. 6, 1928 discloses a lamp socket securing means comprising a bracket member having a pair of spaced apart, parallel arms each having two co-planar portions that have a plurality of teeth extending from opposite sides thereof. The teeth interact with a spring clip for position adjustment. U.S. Pat. No. 952,053 issued to Tarleton on Mar. 15, 1910 discloses an adjustable pipe hanger comprising a stem having a plurality of notches or indentations along one edge that interacts with a spring loaded ball detent for vertical position adjustment. U.S. Pat. No. 178,733 issued to Carter et al. on June 13, 1876 discloses a chandelier height adjusting device which employs a pair of oppositely facing, pivotal cams having teeth-like projections secured to a vertically extending rod member that is spring loaded and to which the chandelier is attached. Another outer tube has a series of teeth-like projections on its inner surface that interact with the projections on the cam for position adjustment.

The present invention provides a novel method for position adjustment in that the means for adjustment is integral with the hanger. The prior art devices required either pivot means for disengaging the hanger member from the support or a manual manipulation of several interacting parts to adjust the supported article from one position to the next.

Accordingly it is an object of the present invention to provide a simple, inexpensive hanger device for adjustably securing an article to a wall member.

It is a further object of the present invention to provide a hanger device in which one of either the bayonet member or the channel means is equipped with resiliently deformable projections that interact with projection receiving means on the other of either the bayonet member or the channel means to thereby allow position adjustment by simply advancing or retracting the bayonet member to the desired position.

It is a still further object of the present invention to provide a hanger device in which the force required to adjust the position of the article to be supported can be varied by relatively simple design changes to thereby permit use of the hanger device with a wide variety of articles of varying size and weight or for use in applications requiring child resistant adjustment.

Still further objects of the invention will become apparent from the detailed description of the invention below.

DISCLOSURE OF THE INVENTION

A hanger with a resiliently deformable planar member is provided for adjustably supporting articles on a vertical wall member. In a particularly preferred embodiment the hanger comprises a planar bayonet member of predetermined height and width having at least one resiliently deformable cantilever-like projection extending outwardly from one or both of the longitudinal edges thereof and extending in a direction generally parallel to the width of the bayonet member. It further comprises a channel means of predetermined length and width having opposed longitudinal edges located in the plane of the bayonet member's projections. The opposing longitudinal edges of the channel means are provided with a multiplicity of vertically spaced projection-receiving means having a shape substantially complementary to the resiliently-deformable projections on the bayonet member. The projections on the bayonet member engage the opposed longitudinal edges of the channel means such that the vertical position of the supported article may be adjusted as desired by advancing or retracting the bayonet member in relation to the channel means in a direction generally parallel to the length of the bayonet member. A means for engaging a vertical wall member is provided either on the bayonet member or the channel means.

BRIEF DESCRIPTION OF THE DRAWINGS

While the specification concludes with claims particularly pointing out and distinctly claiming the subject matter which is regarded as the present invention, it is believed that the invention will be better understood from the following description taken in connection with the accompanying drawings in which:

DESCRIPTION OF THE PRESENT INVENTION

Figure 1:
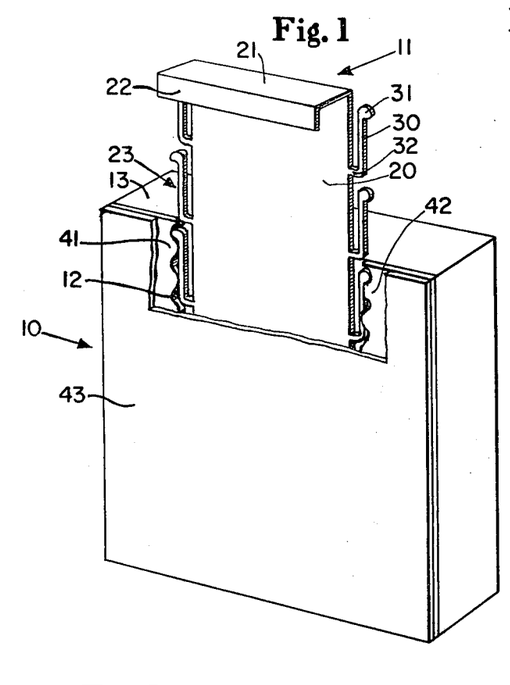
FIG. 1 is a perspective view of a preferred hanger embodiment of the present invention in which the channel means is integral with the article to be supported.
Figure 2:
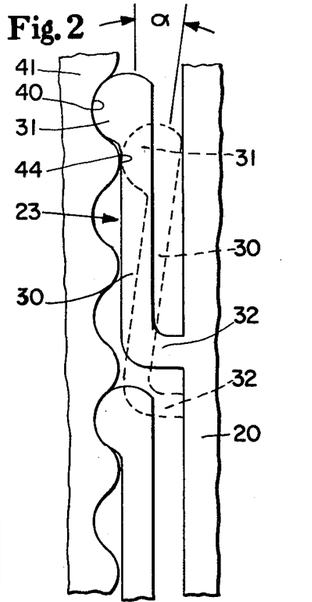
FIG. 2 is an enlarged fragmentary view of the resiliently deformable projections on the bayonet member of a preferred hanger embodiment, shown in FIG. 1, engaged in the projection-receiving means on the channel means.

Referring now to FIG. 1, there is shown a preferred hanger 10 of the present invention. This illustrated hanger embodiment will be described in connection with the present invention for simplicity only and it should be understood that the present invention is not limited to this embodiment. The hanger 10 comprises a bayonet member 11, a channel means 12 and a nondescript article to be supported by this hanger, such as a toilet bowl dispenser for dispensing chemicals for cleaning and disinfecting to the toilet tank, as indicated at 13. The bayonet member 11 includes a vertically extending support leg 20, a horizontally extending intermediate portion 21 connected to the upper edge of the support leg 20 at a first edge and a vertically extending hanger 22 parallel to support leg 20 and which connects at its upper edge to the intermediate portion 21 at a second edge opposite the first edge to which the support leg 20 is connected. The bayonet member 11 is adapted to hook over any vertical wall member such that intermediate portion 21 will be resting on the top horizontal edge of the wall member and hanger leg 22 will be acting as the means to retain the bayonet member 11 on the wall member. The length of the intermediate member 21, i.e., the dimension between the support leg 20 and the hanger leg 22, is determined by the thickness of the wall member or members from which an article is to be supported. The length of the support leg 20 and the hanger leg 22 can be varied as required. The bayonet member 11 further includes two series of spaced-apart, resiliently-deformable, projections 23 extending outwardly from both longitudinal edges of the support leg 20. They are positioned such that each projection on one edge has a projection on the opposite edge in the same horizontal plane. Each of the projections 23 comprises an L-shaped arm having a knob end 31 at the upper end of the vertically-extending flex arm 30 and a connecting element 32 for connecting the flex arm 30 to the support leg 20. The knob end 31 is designed to interact with the channel means's projection receiving means or notches 40 which are complementary in design to the knob end 31. The preferred knob end 31 shown in the detailed view in FIG. 2 is a rounded, semicircular extension. Other knob end designs could easily be employed. The vertically-extending flex arm 30 is positioned such that the edge facing outwardly from the support leg 20 will contact the crest points 44 and act to guide and center the bayonet 11 in the channel 12.

The bayonet member 11 is sized to fit into a predetermined and appropriately sized channel means 12. The supported article 13 can be positioned at any point relative to the bayonet member 11 in which the two series of parallel projections 23 on each side of the bayonet member 11 engage the two series of parallel projection-receiving means or notches 40. The vertical position of the article to be supported can be adjusted by advancing or retracting the bayonet member 11 in channel means 12.

The channel means 12 further comprises the channel forming panels 41 and 42, each of which have a series of notches 40 on one of its longitudinal edges for engaging the knob end 31 of the projections 23, and a flat back panel 43 to complete the channel. The panels 41, 42 and 43 can be formed either integrally to the supported article or they can be an assembly of panels, as shown, appropriately secured to the supported article to form the channel means 12.

The projections 23 are shown in detail in the enlarged, fragmentary view in FIG. 2. The knob end 31 of the flex arm 30 is shown engaged in the complementary notch 40. When the bayonet member 11 is advanced or retracted in order to adjust the position of the supported article the knob end 31 moves out of the notch 40 onto the crest point 44 causing the flex arm 30 to pivot about connecting element 32. Since the projections 23, shown in this embodiment, are placed along the longitudinal edges of the bayonet member 11 so as to be paired with another projection 23 on the opposite edge of support leg 20 the advancing and retracting of the bayonet member will cause a pair of projections to pivot at the same time. It should be noted that there are a number of modifications to this embodiment that one of ordinary skill in the art can readily provide as alternatives. For example, the bayonet member can be designed to have the series of projections 23 on only one edge of the support leg 20 with the opposite edge being square to the channel member edge and to thereby act as a guide. Also, the series of projections 23 could be on only part of either one or both edges and the remainder of the edge or edges could be square to the channel member edge.

Figure 3:
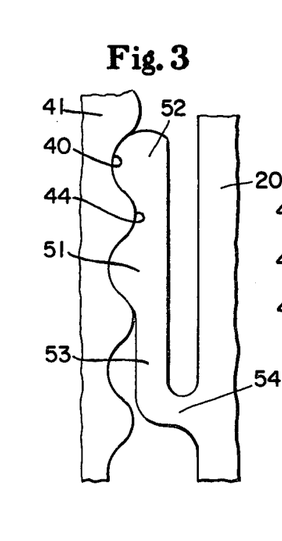
FIG. 3 is an enlarged fragmentary view of the resiliently deformable projections of an alternative hanger embodiment installed in the projection-receiving means.
Figure 4:
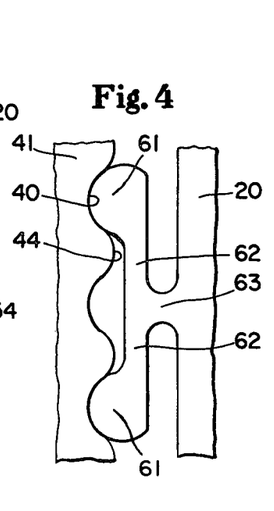
FIG. 4 is an enlarged fragmentary view of the resiliently deformable projections of an alternative hanger embodiment installed in the projection-receiving means.
Figure 5:
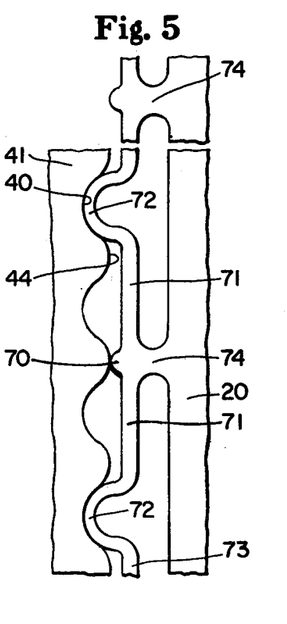
FIG. 5 is an enlarged fragmentary view of the resiliently deformable projections of an alternative hanger embodiment installed in the projection-receiving means.

The projections 23 can also be readily modified by one of ordinary skill in the art to accommodate a variety of functional and aesthetic purposes. The enlarged, fragmentary views in FIGS. 3–5 show several alternative embodiments for the resiliently deformable projections 23 on the bayonet member 11. FIG. 3 shows a similar L-shaped flex arm 53 having a pair of knobs 51 and 52 which interact with the notches 40 in the channel member 12. The flex arm 53 pivots about connecting element 54 when the position is adjusted. FIG. 4 shows a T-shaped flex arm 62 having knobs 61 at either end of the top of the T. The flex arm 62 pivots about connecting element 63 when the position of the supported article is adjusted. FIG. 5 shows a different style of T-shaped flex arm 71. The flex arms 71 pivot about connecting element 74 such that protuberance 72 formed at the end of flex arms 71 can adjustably engage notches 40. The flex arms 73 extend to additional connecting elements 74. In addition, a centrally-located boss 70 is provided to be in contact with a crest point 44 when the protuberances 72 are engaged in notches 40 and to act as a spacing and stabilizing means.

Figures 6, 7, 8, 9:
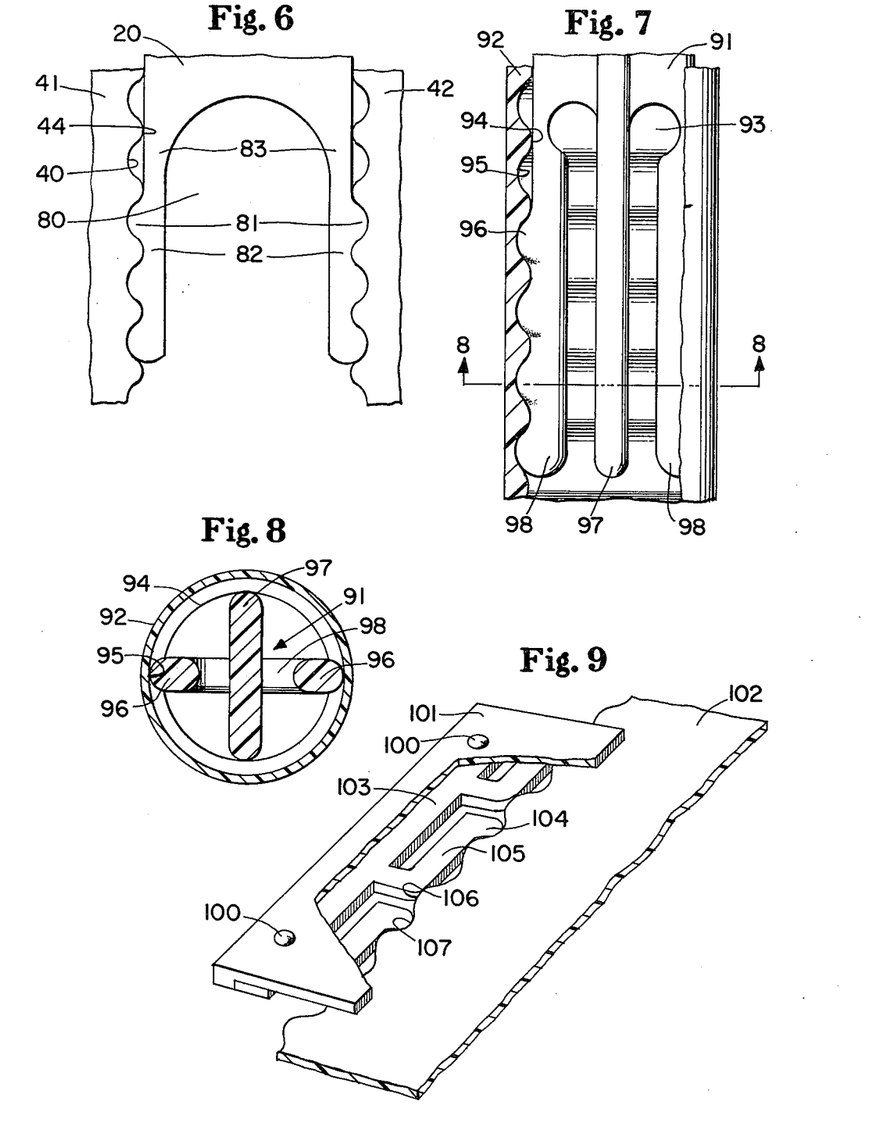
FIG. 6 is an enlarged fragmentary view of the lower segment of the bayonet member of an alternative hanger embodiment showing the resiliently deformable projections on the bayonet member installed in the projection-receiving means of a channel means.
FIG. 7 is an enlarged fragmentary view of the lower segment of the bayonet member of an alternative hanger embodiment showing the resiliently deformable projections on the bayonet member installed in the projection-receiving means of the channel means.
FIG. 8 is a cross-sectional view of the alternative hanger embodiment shown in FIG. 7 taken along Section Line 8—8 in FIG. 7.
FIG. 9 is an enlarged fragmentary perspective view of an alternative hanger embodiment in which the bayonet member is provided with projection-receiving means and the resiliently deformable projections are formed on a separate element and are secured to a channel means on the article to be supported.

In addition to modifications to the projections 23, similar alternative configurations can be provided for the other elements that comprise the present invention. An alternative embodiment for the bayonet member 11 is shown in FIG. 6. The fragmentary view shows a lower portion of the support leg 20 having projections 82 and knob ends 81. In this embodiment the resiliently deformable projection member is formed by cutting out a generally upside down, U-shaped segment 80 from the lower portion of the support leg 20. A series of knob ends 81 are formed along the outwardly facing edge of the remaining part of the lower portion forming the projection members 82 which engage complementary notches 40 in the channel means 12. The projection members 82 will pivot inwardly about points 83 when the position of the bayonet member 12 is adjusted.

The present invention is also adaptable to a variety of surfaces of different geometry. Referring to FIG. 7 there is shown a bayonet member 91 which includes an upper section, not shown, having any desired means of attachment to facilitate vertically adjustable placement of an article or dispenser, a channel 92 defined either integral with the dispenser or attached to it and a pair of parallel engaging legs 98 having a series of knob ends 96 and a guide leg 97 that is perpendicular to and centrally-located with respect to the engaging legs 98. In addition, the bayonet member 91 includes a pair of recesses 93 cut into the juncture point between the engaging legs 98 and the upper section of the bayonet member 91. The recesses 93 define the pivot point around which the engaging legs 98 pivot when the bayonet member 91 is being re-positioned relative to a channel means 92. The channel means 92 includes a minor diameter or series of crests 94 that are equivalent to the width between the opposed guide legs 97, and a major diameter that is defined by the series of projection receiving means or notches 95 and that is equivalent to the distance between the knob ends 96 on the oppositely facing engaging legs 98. The bayonet member 91 and the associated channel means 92 are shown in cross-section in FIG. 8. It should be observed that a variety of geometric shapes e.g., triangular, square, etc., can be employed to use the present invention in a similar manner.

Also, the projections can be attached to or be formed integral with the channel means instead of the bayonet member and the complementary projection-receiving means can be part of the bayonet member, as shown in FIG. 9. FIG. 9 shows a bracket member 101 that can be attached to the article to be supported and a projection element 103 fastened to bracket 101 by fastening means 100 such as rivets or the like. The projection element 103 includes flexarm 105 and knob end 104 and is similar to the projection 23 shown in FIG. 2. However, any of the other projection embodiments, such as those shown in FIGS. 3–5, can be employed with equal facility. The bayonet member 102 includes the projection receiving notch 107 and the crest 106. Adjustment of the article to be supported is accomplished by the same procedure.

Figure 10:
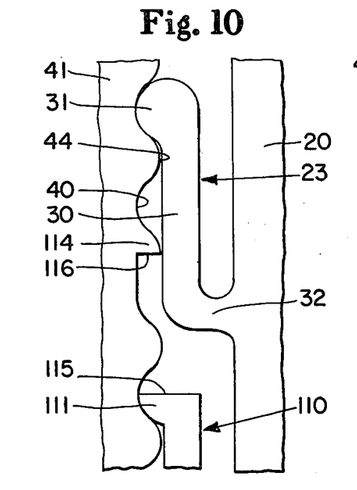
FIG. 10 is an enlarged fragmentary view of the resiliently deformable projections of the preferred hanger embodiment engaged in the projection receiving means in which one of the projections and one of the projection receiving means have been modified to form a stop means.

In addition, the hanger 10 could be designed to incorporate a stop such that the bayonet member 11 will be retained in the channel 12 until the back plate 43 is removed. FIG. 10 shows an enlarged fragmentary view of one embodiment of such a stop. The uppermost projection 23 is similar to the projection 23 shown in FIG. 2. The lower projection 110 is essentially the same as projection 23, having a flex arm and connecting element not shown. However the knob end 111 has been modified such that the top half of the knob end has been removed. The top surface 115 of knob end 111 is now flat. The channel means 12 has also been modified so that part of one of the peaks 44 has been cut away, at 114, to provide a flat lower surface 116. The flat surface 115 of the knob end 111 will eventually meet the flat surface 116 of the notch and thereby prevent any further upward movement by the bayonet member 11. In the preferred embodiment there are two stops formed in the channel and bayonet member positioned along both edges in the same horizontal plane.

Figure 11:
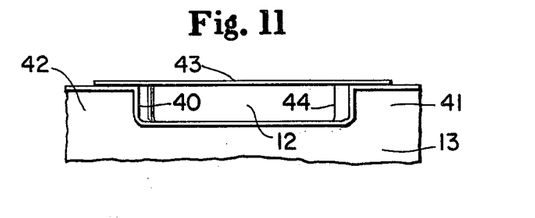
FIG. 11 is a cross-sectional view of an alternative channel means in which the projection receiving means are formed integral with the supported article and in which a back plate is provided.
Figure 12:
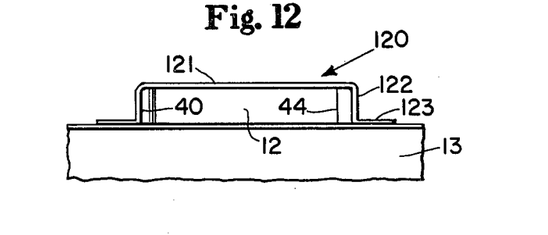
FIG. 12 is a cross-sectional view of an alternative channel means in which the projection receiving means and the channel are formed in a sheath that can then be secured to the supported article.
Figure 13:
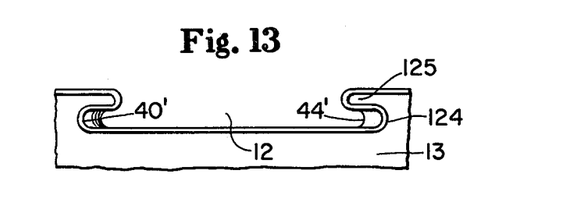
FIG. 13 is a cross-sectional view of an alternative channel means in which the projection receiving means are formed integral with the supported article and are formed with a dovetail edge to eliminate the need for a back plate.
Figure 14:
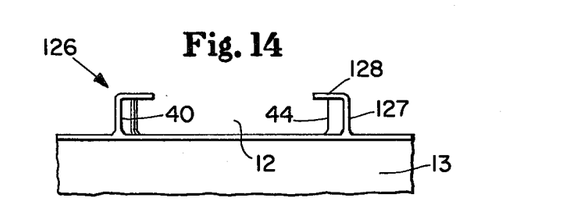
FIG. 14 is a cross-sectional view of an alternative channel means in which the projection receiving means and a partial back plate are injection molded and secured to the supported article.

The channel means of the present invention can be formed in a variety of ways. Several embodiments are illustrated in cross-section in FIGS. 11–14, with a particularly preferred embodiment being shown in FIG. 11. In FIG. 11 there is shown a channel 12 formed by back plate 43 and side panels 41 and 42 which are integral with the supported article 13. The alternative illustrated in FIG. 12 includes a formed sheath 120 that comprises a back panel 121, a pair of side panels 122 having the notches 40 and crest points 44 integrally formed therin and a pair of bracket panels 123 to provide a means for attaching the sheath 120 to an article. The alternative illustrated in FIG. 13 includes side panels 124 and dovetail extensions 125 integrally formed in the article. The notches 40' and crest points 44' are formed into the side panels 124. In this alternative embodiment a back plate is not required to retain the bayonet member 11 in the channel 12. The alternative embodiment illustrated in FIG. 14 includes a pair of injection molded channel corners 126 into which the notches 40 are formed. The channel corners 126 each include a side 127 and a back 128. The corners 126 can be formed integral with the supported article or they can be secured by appropriate means. These alternative embodiments are exemplary only and additional alternatives within the scope of the present invention could readily be provided by one of ordinary skill in the art.

To practice the present invention the projection must be formed from a material that is capable of rigidly supporting a dispenser or article and that is capable of sufficient resilience such that the projection arm 23, reference FIG. 2, will pivot through an angle $\alpha$ that is sufficient for knob end 31 to clear the crest points 44. The pivot angle $\alpha$ will vary in the preferred embodiment, depending upon the length of the flex arm 30. Therefore a wide range of materials with differing degrees of resilience can be employed by properly configuring the projections 23. Similarly, the alternative embodiments must be capable of flexing sufficiently so that the knob ends clear the crest points 44.

For purposes of illustration, the hanger 10 can be used to support a toilet tank dispenser of the type generally disclosed in FIG. 1 of U.S. Pat. No. 4,171,546 issued to Robert S. Dirksing on Oct. 23, 1979, said patent being hereby incorporated herein by reference. Furthermore the hanger 10 could be used in conjunction with a tilt compensating feature utilized to accommodate non-vertical toilet tank walls, as generally disclosed in FIG. 1 of the copending, commonly assigned patent application of Robert S. Dirksing, filed July 23, 1979, assigned Ser. No. 060,088, and entitled "Tilt Compensating Hanger for Toilet Tank Dispensing Apparatus," said patent application being hereby incorporated herein by reference.

The hanger 10 is preferably used to support the dispenser from the tank wall of a toilet. It has been found that most toilet tank walls are between about 6 mm and about 15 mm thick. Therefore, the intermediate portion 21 is preferably equivalent to the larger thickness or about 15 mm. The length of hanger leg 22 is preferably sufficient to effectively hold the dispenser and to permit immersion of the dispenser to the desired level in the toilet tank. The length of hanger leg 12 is therefore dependent on the dispenser configuration and on the requirements of the dispenser for dispensing chemicals into the toilet tank water. Also the hanger is preferably slightly inwardly directed. In an exemplary embodiment the hanger leg was 18 mm long. The support leg 20 preferably has a length somewhat greater than the dispenser and can vary considerably as desired. The projections 23 in the aforementioned exemplary embodiment are about 11 mm long from the lower edge of the connecting element 32 to the upper edge of the knob end 31. The flex arm 30 is about 3 mm wide and is approximately 1 mm from the nearest edge of support leg 20. The knob end 31 has a semicircular surface with a 2 mm radius to fit into notches 40 and extends approximately an additional 2 mm outwardly from the flex arm 30. The resulting flex angle α is therefore about 17°. The support leg 20 of the exemplary embodiment for use with the dispenser is about 47 mm wide and about 1.5 mm thick. However, for different applications and for different materials of cnstruction the physical dimensions of the support leg 20 can vary widely as previously discussed.

The channel 12 has a crest point 44 of about 48 mm such that the outwardly facing surfaces of the projections 23 on either side of the support leg 20 are in close proximity to or in touching contact with the crest points 44. The notches 40, which are complementary to knob ends 31, are about 2 mmd deep and preferably have a radius slightly greater than the radius on knob end 31. The closer the radius of the knob end 31 is to that of the complementary notch 40 the better will be the fit between the mating parts. However, it is frequently difficult to fabricate parts of this type with sufficient precision and still be economical. Therefore, to maximize economy of manufacture, it is preferred to have the radius of the notch 40 slightly greater than the complementary knob end 31 since this results in a single point of contact in which the knob end 31 bottoms out in the notch 40. The channel forming members 41 and 42 are preferably slightly greater in thickness than the hanger 10 so that the hanger 10 is free to move inside the channel when back plate 43 is secured in place.

As mentioned above, the hangers of the present invention can be formed from a wide variety of materials so long as they exhibit the required resilience and support capacity. A particularly preferred embodiment is made from a flexible plastic such as high impact styrene which exhibits sufficient resilience and good support capacity. For aesthetic and practical purposes the hanger should be substantially free of warp. One of ordinary skill in the art can easily select a number of materials suitable for use with the present invention. However, an important design consideration is the method of fabricating or forming the hanger. Therefore, the material to be employed is preferably chosen in light of the most economical method of making the hanger, consistent with hanger quality requirements. The most practical and economical methods for production are presently believed to be be injection molding or punching. The preferred method for making the exemplary high impact styrene hanger embodiment is injection molding.

It is to be understood that the forms of the invention described and illustrated herein are to be taken as preferred embodiments. Various changes and modifications can readily be made by one or ordinary skill in the art without departing from the spirit or scope of the present invention as defined in the appended claims.

Having thus described the invention, what is claimed is:

1. A vertically adjustable hanger for supporting a dispenser for adding a chemical to a toilet tank on a vertical wall member of said toilet tank at a predetermined height selected by the user, said hanger comprising:

(a) a planar bayonet member having a predetermined length, width and thickness, said bayonet member having means for being attached to said wall member, said bayonet member including at least one resiliently deformable projection located along a longitudinal edge thereof and extending outwardly in a direction generally parallel to the width of said bayonet member, said projection being resiliently deformable in the plane of said bayonet member in a direction generally parallel to the width thereof; and (b) a channel means secured to said dispenser, said channel means having a predetermined length, width and thickness, said channel means having opposed longitudinal edges located in the plane of said bayonet member, said opposed longitudinal edges of said channel means being adapted to engage opposed longitudinal edges of said bayonet member, at least one of said longitudinal edges of said channel means having a multiplicity of vertically spaced projection receiving means having a shape substantially complementary to that of said projection located along at least one of said longitudinal edges of said bayonet member and adapted to engage said projection on said longitudinal edge of said bayonet member, whereby the vertical position of said dispenser may be adjusted as desired by advancing or retracting said bayonet member in said channel means in a direction generally parallel to its length by engaging said resiliently deformable projection on said bayonet member in one of said projection receiving means located along the adjacent longitudinal edge of said channel means.

2. The hanger of claim 1 wherein said bayonet member further includes at least one resiliently deformable projection located along each longitudinal edge thereof and extending outwardly in a direction generally parallel to the width of said bayonet member, each of said projections being resiliently deformable in the plane of said bayonet member in a direction generally parallel to the width thereof.

3. The hanger of claim 1 wherein said resiliently deformable projection on said bayonet member includes a connecting element attached to and extending outwardly from and perpendicular to said bayonet member, a pair of flex arms attached to said connecting element with one extending upwardly and one extending downwardly parallel to said bayonet member and at least one semicircular knob end.

4. The hanger of claim 1 wherein said resiliently deformable projection on said bayonet member includes a series of spaced apart connecting elements attached to and extending outwardly from and perpendicular to said bayonet member, a flex arm attached at one end to a first of said connecting elements and at its other end to a second of said connecting elements and having a semicircular bend midway between said first and said second connecting elements extending outwardly from said bayonet member.

5. A vertically adjustable hanger for supporting a dispenser for adding a chemical to a toilet tank on a vertical wall member of said toilet tank at a predetermined height selected by the user, said hanger comprising:
   (a) a planar bayonet member having a predetermined length, width and thickness, said bayonet member having means for being attached to said wall member, said bayonet member also having opposed longitudinal edges, said edges having a multiplicity of vertically spaced projection receiving means located along at least one of said longitudinal edges; and
   (b) a channel means secured to said dispenser, said channel means having a predetermined length, width and thickness, said channel means having opposed longitudinal edges located in the plane of said bayonet member, said opposed longitudinal edges of said channel means having at least one resiliently deformable projection located along one of said longitudinal edges thereof and extending outwardly in a direction generally parallel to the width of said bayonet member, said projection being resiliently deformable in the plane of said bayonet member in a direction generally parallel to the width thereof, said projection receiving means of said bayonet member having a shape substantially complementary to that of said projection and being adapted to engage said projection on said longitudinal edge of said channel means, whereby the vertical position of said dispenser may be adjusted as desired by advancing or retracting said bayonet member in said channel means in a direction generally parallel to its length by engaging said resiliently deformable projection on said channel means in one of said projection receiving means located along the adjacent longitudinal edge of said bayonet member.

6. The hanger of claim 5, wherein said resiliently deformable projection on said channel member includes a connecting element attached to and extending outwardly from said channel member and perpendicular to said bayonet member, a flex arm attached to said connecting element and extending upwardly parallel to said bayonet member, and at least one semicircular knob end at the free end of said flex arm on the surface of said flex arm facing outwardly from said channel member.

7. The hanger of claim 5 wherein said resiliently deformable projection on said channel member includes a connecting element attached to and extending outwardly from said channel member and perpendicular to said bayonet member, a pair of flex arms attached to said connecting element with one extending upwardly and one extending downwardly parallel to said bayonet member and at least one semicircular knob end at the free end of each of said flex arms on the surfaces of said flex arms facing outwardly from said channel member.

8. The hanger of claim 5 wherein said resiliently deformable projection on said channel member includes a series of spaced apart connecting elements attached to and extending outwardly from said channel member and perpendicular to said bayonet member, a flex arm attached at one end to a first of said connecting elements and at its other end to a second of said connecting elements and having a semicircular bend midway between said first and said second connecting elements extending outwardly from said channel member.

9. The hanger of claim 1 or 5 wherein said bayonet member includes a hook means for securing it uppermost end to said wall member.

10. The hanger of claim 5 wherein:
   (a) said channel means has at least one of said projections having a flat upper surface; and
   (b) said bayonet member has at least one of said mating projection receiving means having a flat lower surface
whereby when said flat upper surface on said projection engages said flat lower surface on said projection receiving means, said bayonet member will be unable to adjust further upwardly.

11. The hanger of claim 5 wherein said channel means includes a formed channel portion having two opposed sides integrally connected by a back wall and a flat front wall that is secured to said side walls of said channel portion to form a generally rectangular channel.

12. The hanger of claim 1 or 5 wherein said channel means includes a channel portion having two opposed side walls connected by a back wall, said side walls each having a lip extending toward the opposed side wall and parallel to said back wall.

13. A vertically adjustable hanger for supporting a dispenser for adding a chemical to a toilet tank on a vertical wall member of said toilet tank at a predetermined height selected by the user, said hanger comprising:
   (a) a planar bayonet member having a predetermined length, width and thickness, said bayonet member having opposed longitudinal edges and each edge having a downwardly extending resilient extension arm, each of said extension arms having a series of projections located on its outwardly facing edge and extending outwardly in a direction generally parallel to the width of said bayonet member, said extension arms being resiliently deformable in the plane of said bayonet member in a direction generally parallel to the width thereof; and
   (b) a channel means secured to said dispenser, said channel means having a predetermined length, width and thickness, said channel means having opposed longitudinal edges located in the plane of said bayonet member, said opposed longitudinal edges of said channel means being adapted to engage opposed longitudinal edges of said bayonet member, at least one of said longitudinal edges of said channel means having a multiplicity of vertically spaced projection receiving means having a shape substantially complementary to that of said projection located along at least one of said longitudinal edges of said bayonet member and adapted to engage said projection on said longitudinal edge of said bayonet member, whereby the vertical position of said article may be adjusted as desired by advancing or retracting said bayonet member in said channel means in a direction generally parallel to its length by engaging said resiliently deformable projection on said bayonet member in one of said projection receiving means located along the adjacent longitudinal edge of said channel means.

14. A vertically adjustable hanger for supporting a dispenser for adding a chemical to a toilet tank on a vertical wall member of said toilet tank at a predetermined height selected by the user, said hanger comprising:

(a) a planar bayonet member having a predetermined length, width and thickness, said bayonet member having means for being attached to said wall member, said bayonet member including at least one resiliently deformable projection located along a longitudinal edge thereof and extending outwardly in a direction generally parallel to the width of said bayonet member, said projection being resiliently deformable in the plane of said bayonet member in a direction generally parallel to the width thereof, said bayonet member also including a connecting element attached to and extending outwardly from and perpendicular to said bayonet member, a flex arm attached to said connecting element and extending upwardly parallel to said bayonet member, and at least one semicircular knob end at the free end of said flex arm on the surface of said flex arm facing outwardly from said bayonet member; and (b) a channel means secured to said dispenser, said channel means having a predetermined length, width and thickness, said channel means having opposed longitudinal edges located in the plane of said bayonet member, said opposed longitudinal edges of said channel means being adapted to engage opposed longitudinal edges of said bayonet member, at least one of said longitudinal edges of said channel means having a multiplicity of vertically spaced projection receiving means having a shape substantially complementary to that of said projection located along at least one of said longitudinal edges of said bayonet member and adapted to engage said projection on said longitudinal edge of said bayonet member, whereby the vertical position of said article may be adjusted as desired by advancing or retracting said bayonet member in said channel means in a direction generally parallel to its length by engaging said resiliently deformable projection on said bayonet member in one of said projection receiving means located along the adjacent longitudinal edge of said channel means.

15. A vertically adjustable hanger for supporting a dispenser for adding a chemical to a toilet tank on a vertical wall member of said toilet tank at a predetermined height selected by the user, said hanger comprising:

(b) a channel means secured to said dispenser, said channel means having a predetermined length, width and thickness, said channel means having opposed longitudinal edges located in the plane of said bayonet member, said opposed longitutinal edges of said channel means being adapted to engage opposed longitudinal edges of said bayonet member, at least one of said longitudinal edges of said channel means having a multiplicity of vertically spaced projection receiving means having a shape substantially complementary to that of said projection located along at least one of said longitudinal edges of said bayonet member and adapted to engage said projection on said longitudinal edge of said bayonet member, at least one of said projection receiving means having a flat lower surface, whereby the vertical position of said article may be adjusted as desired by advancing or retracting said bayonet member in said channel means in a direction generally parallel to its length by engaging said resiliently deformable projection on said bayonet member in one of said projection receiving means located along the adjacent longitudinal edge of said channel means, and whereby when said flat upper surface on said projection engages said flat lower surface on said projection receiving means, said bayonet member will be unable to adjust further upwardly.

16. A vertically adjustable hanger for supporting a dispenser for adding a chemical to a toilet tank on a vertical wall member of said toilet tank at a predetermined height selected by the user, said hanger comprising:

(b) a channel means secured to said dispenser, said channel means including a formed channel portion having two opposed side walls connected by a back wall and a flat front wall that is secured to said side walls of said channel portion to form a generally rectangular channel having a predetermined length, width and thickness, said channel means having opposed longitudinal edges located in the plane of said bayonet member, said opposed longitudinal edges of said channel means being adapted to engage opposed longitudinal edges of said bayonet member, at least one of said longitudinal edges of said channel means having a multiplicity of vertically spaced projection receiving means having a shape substantially complementary to that of said projection located along at least one of said longitudinal edges of said bayonet member and adapted to engage said projection on said longitudinal edge of said bayonet member, whereby the vertical position of said article may be adjusted as desired by advancing or retracting said bayonet member in said channel means in a direction generally parallel to its length by engaging said resiliently deformable projection on said bayonet member in one of said projection receiving means located along the adjacent longitudinal edge of said channel means.

* * * * *

UNITED STATES PATENT AND TRADEMARK OFFICE
CERTIFICATE OF CORRECTION

PATENT NO. : 4,436,269
DATED : March 13, 1984
INVENTOR(S) : Robert S. Dirksing and Dale E. Barker It is certified that error appears in the above-identified patent and that said Letters Patent is hereby corrected as shown below:

Cover sheet of patent, section [56], should read as follows:

[56]     References Cited
         U.S. PATENT DOCUMENTS

| Number | Date | Name | Class |
|---|---|---|---|
| 178,733 | 6/1876 | Carter et al. | |
| 546,462 | 9/1895 | Beaton | 248/59 |
| 753,969 | 3/1904 | Fee | 248/59 |
| 766,890 | 8/1904 | Newberg | 248/59 |
| 812,396 | 2/1906 | Bewyer | 248/336 |
| 952,053 | 3/1910 | Tarleton | 248/59 |
| 1,158,633 | 11/1915 | Carpenter et al. | 248/59 |
| 1,690,941 | 11/1928 | Nickerson | 248/327 |
| 1,740,520 | 12/1929 | Murphy | 248/336 |
| 2,065,317 | 12/1936 | Knotschke | 248/327 |
| 2,722,394 | 11/1955 | Titmas | 248/311.2 |
| 2,920,853 | 1/1960 | Bufogle | 248/214 |
| 3,007,177 | 11/1961 | Jackson et al. | 248/309R |
| 3,285,549 | 11/1966 | Cook | 248/31 |
| 3,477,679 | 11/1969 | Lovitz | 248/309 |
| 3,511,535 | 5/1970 | Gunlock | 297/410 |
| 3,778,850 | 12/1973 | Bryan | 4/228 |
| 3,881,673 | 5/1975 | Peterson | 248/94 |
| 3,965,497 | 6/1976 | Corsette | 4/228 |
| 4,203,373 | 5/1980 | Conti | 248/297.2 |
| 4,284,981 | 8/1981 | Black | 248/214 |
| 4,340,199 | 7/1982 | Brock | 248/221.3 |

UNITED STATES PATENT AND TRADEMARK OFFICE
CERTIFICATE OF CORRECTION

PATENT NO. : 4,436,269

DATED : March 13, 1984

Page 2 of 3

INVENTOR(S) : Robert S. Dirksing and Dale E. Barker

It is certified that error appears in the above-identified patent and that said Letters Patent is hereby corrected as shown below:

In the Specification:

Column 7, line 54, delete "mmd" and insert therefor ---mm--.

Column 8, line 24, delete "or" and insert therefor ---of---.

Column 9, line 15, after the word "end" and before the period in Claim 3, insert ---at the free end of each of said flex arms on the surface of said flex arms facing outwardly from said bayonet member---.

Column 12, line 4, before paragraph "(b)" in Claim 15, insert ---(a) a planar bayonet member having a predetermined length, width and thickness, said bayonet member having means for being attached to said wall member, said bayonet member including at least one resiliently deformable projection located along a longitudinal edge thereof and extending outwardly in a direction generally parallel to the width of said bayonet member, said projection being resiliently deformable in the plane of said bayonet member in a direction generally parallel to the width thereof, at least one of said projections having a flat upper surface; and---.

Column 12, line 37, before paragraph "(b)" in Claim 16, insert ---(a) a planar bayonet member having a predetermined length, width and thickness, said bayonet member

UNITED STATES PATENT AND TRADEMARK OFFICE
CERTIFICATE OF CORRECTION

PATENT NO. : 4,436,269

DATED : March 13, 1984

INVENTOR(S) : Robert S. Dirksing and Dale E. Barker

It is certified that error appears in the above-identified patent and that said Letters Patent is hereby corrected as shown below:

> having a means for being attached to said wall member, said bayonet member including at least one resiliently deformable projection located along a longitudinal edge thereof and extending outwardly in a direction generally parallel to the width of said bayonet member, said projection being resiliently deformable in the plane of said bayonet member in a direction generally parallel to the width therof; and---.

Signed and Sealed this

Nineteenth Day of June 1984

[SEAL]

Attest:

Attesting Officer

GERALD J. MOSSINGHOFF

Commissioner of Patents and Trademarks